United States Patent [19]
Feldstein

[11] 4,216,410
[45] Aug. 5, 1980

[54] EMERGENCY LIGHTING SYSTEM

[76] Inventor: Robert S. Feldstein, 1396 Park La., Pelham Manor, N.Y. 10803

[21] Appl. No.: 851,900

[22] Filed: Nov. 16, 1977

[51] Int. Cl.² .......................... H02J 9/06; H02J 7/00; H05B 41/14
[52] U.S. Cl. ........................................ 315/86; 307/66
[58] Field of Search ................ 307/46, 48, 66; 315/86

[56] References Cited
U.S. PATENT DOCUMENTS

| | | | |
|---|---|---|---|
| 3,336,472 | 8/1967 | Steinig | 240/37.1 |
| 3,860,829 | 1/1975 | Fabbri | 307/66 |
| 3,968,417 | 7/1976 | Dials | 307/66 |
| 4,029,993 | 6/1977 | Alley et al. | 307/66 |

Primary Examiner—Eugene R. LaRoche
Attorney, Agent, or Firm—Hubbell, Cohen, Stiefel & Gross

[57] ABSTRACT

An emergency light entirely self-contained that fits into a standard AC fixture in place of a fluorescent or other vapor lamp employs a similar lamp and a rechargeable battery with a system which operates the lamp normally on AC but if AC power fails operates the lamp using battery power. During normal operation on AC the battery is charged by a rectifier charger unit operating in series with the lamp current, which limits battery charge current. When AC power fails the lamp is electrically isolated from the AC line and operated by an inverter unit drawing power from the battery.

11 Claims, 7 Drawing Figures

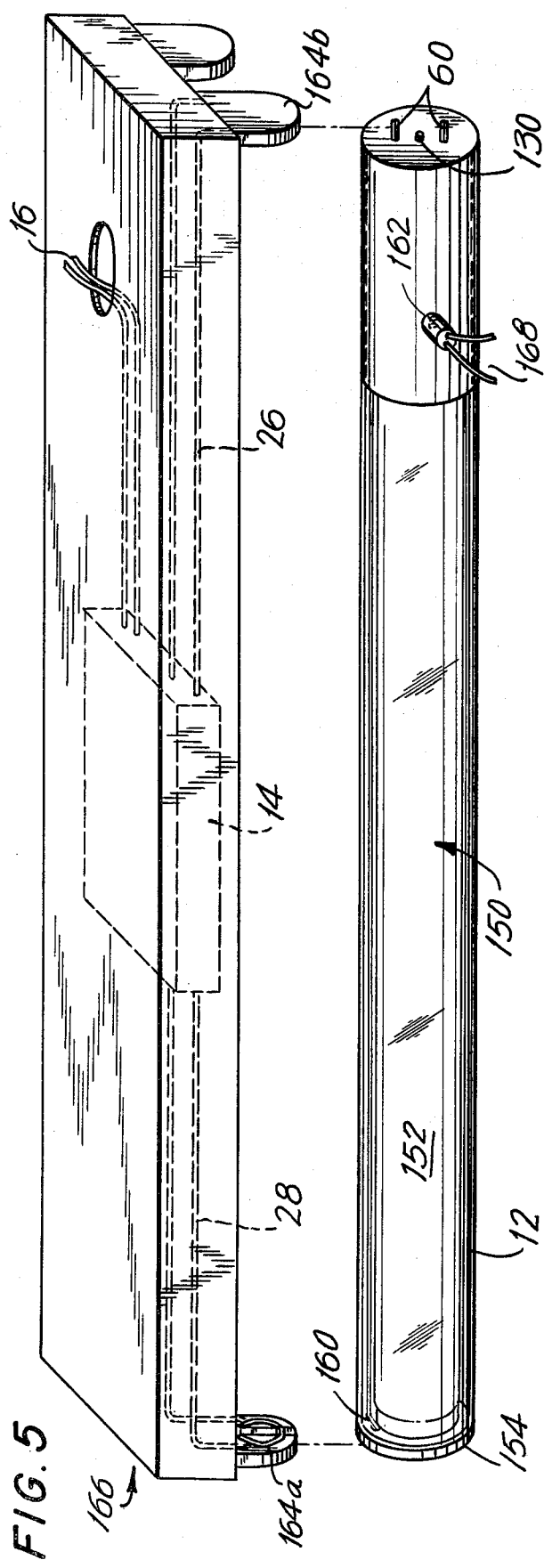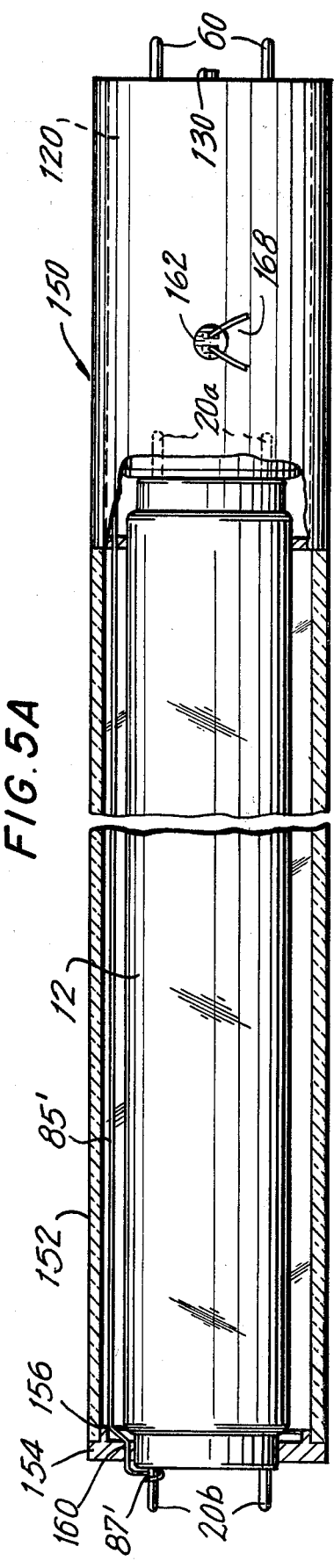

EMERGENCY LIGHTING SYSTEM

BACKGROUND OF THE INVENTION

1. Field of the Invention

The present invention relates generally to emergency lighting systems for energizing a lamp when normally available AC power is disrupted, and more particularly to emergency lighting systems for use in combination with fluorescent or other vapor lamps designed to operate in combination with a ballast.

2. Description of Prior Art

The most simple emergency lighting systems employ a trickle battery charger, a battery, a switch, and a low voltage incandescent lamp. The trickle battery charger is connected to the AC line and supplies a controlled, small charging current to the battery. When power fails on the AC line, the switch automatically connects the battery to the low voltage incandescent lamp, lighting the lamp.

One variation of this simple system is to include a means for stepping up the voltage from the battery so that the emergency light can be an incandescent lamp of standard voltage. If this is done, then by suitable automatic switching the very same incandescent lamp can be lit all of the time, normally from the AC line, but when AC power fails, then from battery power by way of the means for stepping up the voltage. More commonly, the AC line voltage is stepped down to the battery voltage, and one incandescent lamp designed for the battery voltage is used both in normal AC operation and battery powered.

In those buildings most likely to need emergency lighting systems, or to be required to have such by local ordinances, most of the lamps in use are fluorescents. Unlike incandescent lamps, fluorescent or other vapor lamps require a ballast. This may be external in the fixture, or the lamp may be internally ballasted, having the ballast incorporated within the lamp as, for example, a resistor in the lamp base. Thus, fluorescent fixtures contain a ballast to control the operating beam current of the lamp. Some fluorescent fixtures also include a starting capacitor to assist ignition of the lamp.

As noted above, conventional emergency lighting systems include a rechargeable battery and circuit means for charging the battery while the AC line is operative. The charging circuits in the conventional systems are themselves powered by the AC line to develop the requisite battery charging current. An example of such system is disclosed in U.S. Pat. No. 3,684,891, issued Aug. 15, 1972. The patented system shows a charging circuit connected across the AC main, a rechargeable battery and an inverter oscillator having two output leads each of which must be connected to terminals at both ends of a fluorescent lamp, respectively.

It will be understood that if the above prior art system is connected to the lamp while the lamp remains inserted within a fluorescent fixture for normal operation, a problem will arise in the event the ballast which energizes the lamp includes a starting capacitor connected across the leads from the ballast running to the terminals on the fixture into which the lamp is inserted. This is so because the starting capacitor, which has a relatively high impedance at the normal AC operating frequency of 60 hertz, acts as a short circuit across the output of the inverter oscillator of the patented system, the inverter oscillator producing an AC potential at a frequency of 10 kilohertz (10,000 hertz), according to the patent.

Thus, as cautioned in the disclosure of the patented system, the system may be used to provide emergency power for only two out of the four fluorescent lamps contained in a four lamp fixture using conventional AC ballasts. Therefore, no more than half of the noraml illumination available from each fluorescent lamp fixture can be obtained when using the patented system.

A further problem can arise with emergency lighting systems in which electrical connections are made between the system and the lamp while the lamp remains mounted in its own fixture. For example, in the above patented system, a separate connection must be provided to the battery charging circuit from the AC main. Such wiring to the AC main, and any additional wiring required to connect with the ballast leads, often requires a licensed electrician to certify the rewiring for compliance with applicable building codes, thereby leading to installation costs which may easily exceed the cost of the entire emergency system itself.

The above and other shortcomings in the prior art emergency lighting systems are overcome by the present invention.

SUMMARY OF THE INVENTION

The emergency light of the present invention houses in one self-contained unit a lamp, battery, and system such that it may be fitted into a standard fixture in place of a fluorescent or other vapor lamp and there operate normally on AC, and when AC power fails, operate on battery power.

The system includes battery charge means having a rectifier circuit, the charge means having input terminals connected by first switch means in series with the lamp current when the lamp is normally energized by AC. Since this series connection provides indirectly the control usually required within a battery charger to limit battery charge current, it simplifies the battery charge circuits. Output terminals of the battery charge means are connected across the terminals of a rechargeable battery. Thus, the battery charge means is energized and the battery is continually recharged when the lamp is operating off of an active AC line.

The system of the present invention also includes inverter circuit means for developing an AC potential corresponding to the lamp operating potential, the inverter circuit means having an input terminal which is connected by second switch means to the battery when the AC line fails. One output terminal of the inverter circuit means is operatively connected to one of the lamp terminals, and another output terminal of the inverter circuit means is connected by the first switch means to the other lamp terminal when the AC line fails, thereby providing emergency power to illuminate the lamp. During an AC line failure, the lamp is preferably operatively disconnected from the AC ballast by the first switch means so that the AC operating potential developed by the inverter circuit means does not appear across any components included within the AC ballast.

If rapid start lamps having pre-heat filaments are to be used, the present system also includes an isolation transformer operatively connected between one pair of AC ballast leads and one pair of lamp terminals. This allows the rectifier charger unit to be in series with the beam current of the lamp and yet not to interfere with normal pre-heat and ignition, and gives substantial isolation to the lamp in emergency operation during an AC line failure.

When the emergency lighting system is used with ballasted lamps, wherein the ballast is incorporated within the lamp, the system must be designed for the specific lamp, using variations and modifications that will be apparent to those skilled in the art.

Further, the present emergency lighting system may include means for disabling the inverter circuit means when the AC line is alive, and another means for disabling the inverter circuit means when another AC line is alive. Both of these disabling means may include opto-isolators, for example.

Additional means for disabling the inverter circuit means when the system-lamp combination is not mounted in the fixture may also be provided, such additional disabling means including a switch connected across nodes in the inverter circuit means so that the inverter circuit means is disabled when the switch is deactuated, the switch being actuated when the combination is mounted in the fixture.

BRIEF DESCRIPTION OF THE DRAWINGS

FIG. 5 is a perspective exploded view of the present emergency lighting system in relation to a conventional lamp and fixture; and FIG. 5A is a side view, partly in section, of the emergency lighting system shown in FIG. 5.

DETAILED DESCRIPTION OF INVENTION

By way of introduction to the invention, we might first review a simple incandescent type system as described under prior art, and see how it might be improved. In such a simple system, the normal AC lamp is connected across the AC line and, in parallel, so is the battery charger, which is connected to a battery, and by means of an automatic switch the battery is connected to a lamp when AC power fails.

Suppose, instead, the AC lamp were connected in series with the battery charger. Then the lamp current would also be the battery charger input current, which would limit input power to the battery charger, and, in turn, this would serve to limit battery charger output current to the battery. Thus, the usual circuitry in a battery charger to limit battery charge current would be simplified.

This advantage remains in an emergency light using fluorescent or other vapor lamps, and as will be shown in what follows, the series arrangement offers other simplifications as well where ballasts and starting capacitors and other elements associated with these lamps are present.

Figure 1:
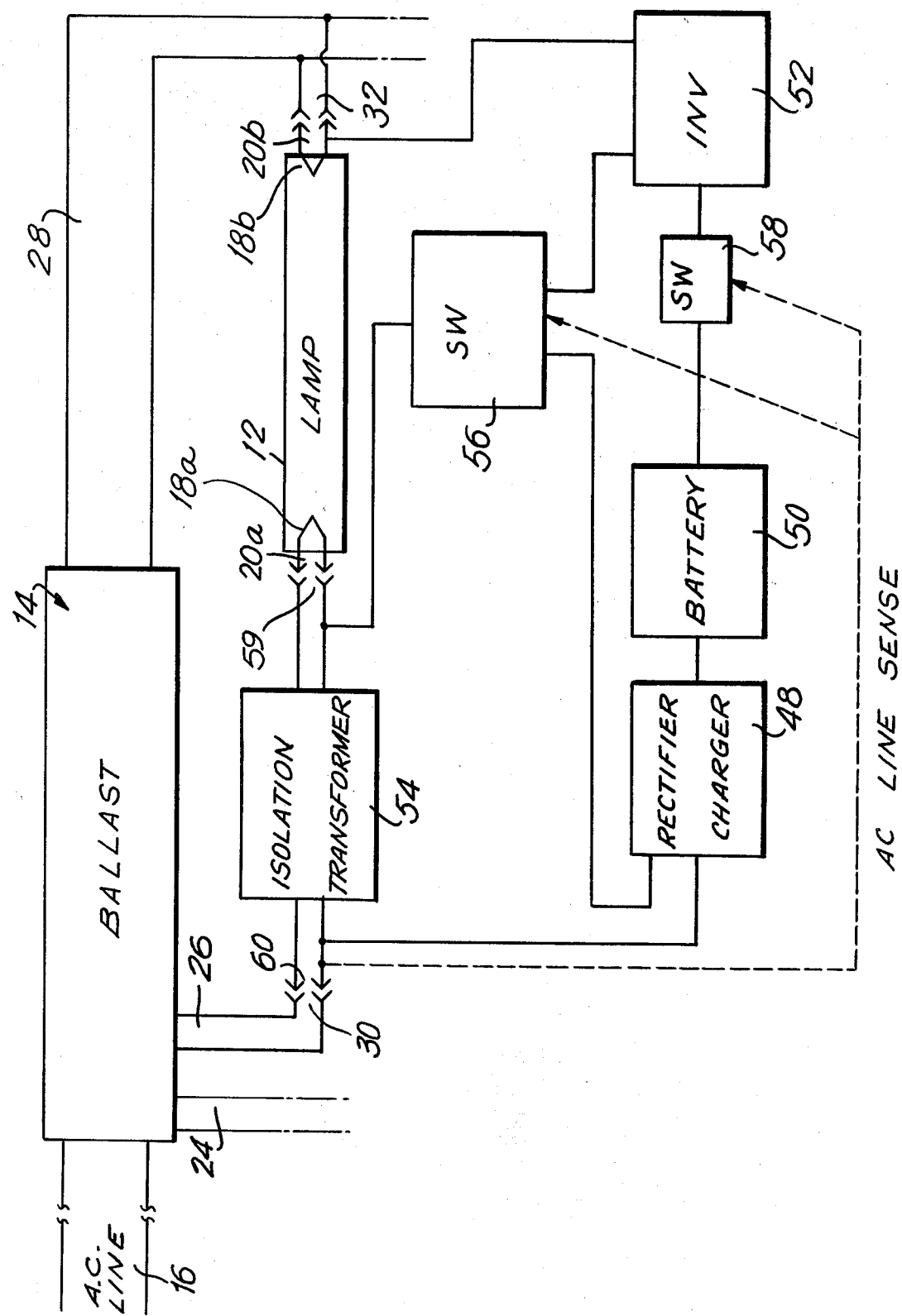
FIG. 1 is a block diagram of an emergency lighting system according to the present invention.

Referring now to the drawings and initially to FIG. 1 thereof, an emergency lighting system 10 according to the present invention is shown in block form, the system 10 being connected to a pre-heat fluorescent lamp 12 and an AC ballast 14 which, in turn, is connected to an AC main line 16. Ballast 14 is itself normally contained within a conventional lamp fixture (unshown) and has leads which terminate in connectors on the fixture for engaging pins provided at the ends of lamp 12, as explained further below. Lamp 12 is shown as being of the rapid start (RS) type, having pre-heating filaments 18a, 18b provided at each end thereof, respectively. Pairs of pin type terminals 20a, 20b provided at each end of the lamp 12, respectively, provide connecting points for the voltage to be applied across the lamp pre-heat filaments 18a, 18b, and for the high voltage operating potential required for the lamp 12, as supplied by ballast 14.

The AC ballast 14 includes conventional windings therein, not shown in FIG. 1, these windings being arranged to provide the pre-heat filament voltages as well as the higher lamp operating potential required for illumination of the lamp 12, and for other similar lamps to be mounted in the same fixture as lamp 12. Pairs of output leads 24, 26 and 28 from the windings within ballast 14 act to supply the pre-heat filament voltage and operating potential to all of the mounted lamps including the lamp 12. The lead pairs 24, 26 and 28 terminate in lamp connector pairs as mentioned above, connector pairs 30, 32 being provided at the ends of lead pairs 26, 28, respectively. Ballast 14 usually includes a conventional starting capacitor (unshown) for developing the requisite firing voltage for lamp 12.

It is further noted that the additional mounted lamps, each similar to the lamp 12, can each be operatively combined with the present invention, although such additional lamps, and the present system components to be associated with each such lamp, identical to the components below shown and described in connection with FIG. 1, are not shown in the figure.

Still referring to FIG. 1, the present emergency lighting system 10 also comprises a rectifier charger unit 48, a rechargeable battery 50, an inverter circuit 52, an isolation transformer 54 and "power off" switches 56, 58, the lamp 12 being electrically connectable with the system 10 as by lamp pins 20a at one end thereof and connecting pins 59 connected to system 10 as shown in the figure.

The present system 10 is preferably contained in a cylindrical housing of inside diameter somewhat larger than that of lamp 12, so that the system 10 and the lamp 12 can both be inserted in a conventional lamp fixture after being joined to one another within the housing, there being no additional wiring required. The preferred system housing and its relation to lamp 12 and a conventional lamp fixture is shown and described later in connection with FIGS. 5 and 5A.

Due to the fact that the present system 10 is preferably physically connected to an end of lamp 12 before the resulting combination is mounted, in a common housing, in a lamp fixture, it will be easily understood that lamp 12 must be of a shorter length than those lamps which are ordinarily mounted in the fixture without the system 10 connected thereto. For example, a conventional two lamp, 40 watt fluorescent fixture, may ordinarily mount two F40T12XXRS fluorescent lamps, each of these lamps being four feet long. The present system 10, if housed in a cylindrical package about 12 inches long, will be capable of use in combination with a three foot F30T12 lamp, the combination forming a direct replacement for the F40T12 type lamp as regards overall length. Two 30 watt lamps will then be able to operate in the dual 40 watt fixture, each combined with an associated emergency system such as 10, at a normal operating beam current of about 400 ma and at a somewhat reduced operating voltage of, for example about 75 volts rms. Note that the introduction of the battery charger in series with a shorter lamp helps to partially offset the lower operating voltage of the shorter lamp—making the combination appear more normal to the ballast, i.e., improving the "match" between the ballast and the shorter lamp. Of course, the emergency lighting system 10 will operate as well in combination with other length fluorescent lamps and, in addition, need not be physically attached thereto as described, although such attachment is preferred for ease of installation of the system 10 into existing lamp fixtures. Indeed, as may be desired, one of the lamps may be a conventional four foot 40 watt lamp conventionally mounted in the fixture, and the other lamp may be a three foot 30 watt (or smaller) lamp connected to the emergency lighting circuitry of the present invention.

The preferred system houusing (FIGS. 5 and 5A) has pin pair 60 extending at one end thereof for engaging connector pair 30 on the fixture, thereby connecting system 10 to ballast 14. Lamp pin connectors 20b extend out from the other end of the housing for connecting lamp 12 to leads 28 from ballast 14 by way of pin connectors 32 on the fixture.

Figure 2:
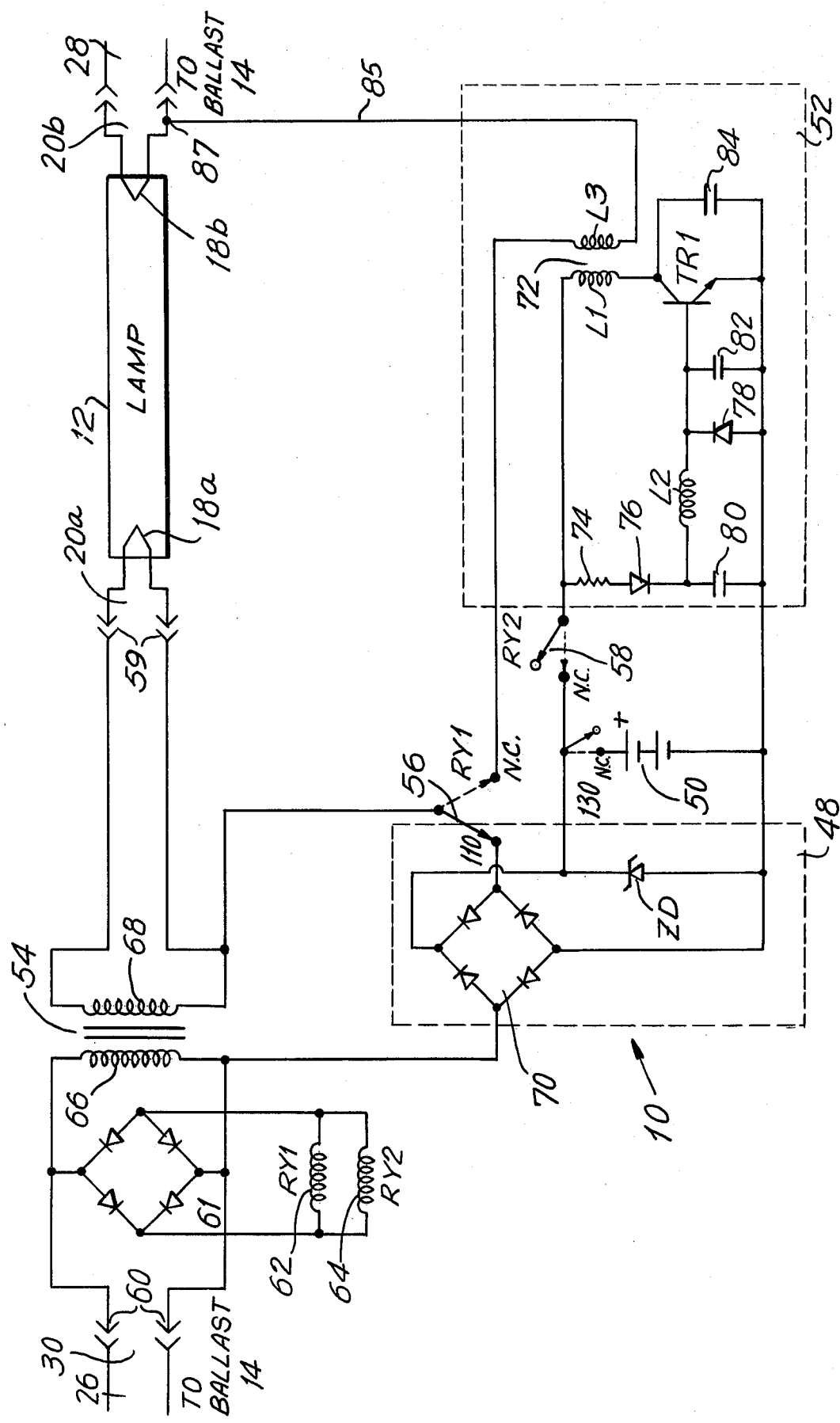
FIG. 2 is a schematic diagram of a simple embodiment of the emergency lighting system of FIG. 1.

Those components shown in block form in FIG. 1 will now be described in further detail with reference to FIG. 2. For purposes of clarity in FIG. 2, ballast 14 and all leads connected thereto, except lead pairs 26, 28, are not shown. The isolation transformer 54 is shown in FIG. 2 as having windings 66, 68. Insulation provided between widings 66, 68 should be sufficient to withstand the operating voltage applied across lamp 12, including a suitable safety margin. Winding 66 is connected to the pin pair 60 which, as noted, mate with the corresponding connectors 30 on the lamp fixture being used. Winding 66 also connects to input terminals of a diode bridge rectifier network 61, the bridge 61 providing a DC output voltage for energizing relay coils 62, 64.

The coils 62, 64, when energized, actuate corresponding relays RY1, RY2, respectively. Relays RY1, RY2 correspond to the "power-off" switches 56, 58, respectively, of FIG. 1, the switches 56, 58 being shown in FIG. 2 as the movable contact members of said relays in their normal or AC "power-on" condition.

Winding 68 of isolation transformer 54 is connected to system connector pair 59 which operatively engages the pins 20a at one end of lamp 12.

The rectifier charger unit 48 shown in FIG. 1 appears as diode bridge rectifier network 70 and zener diode ZD in FIG. 2. In the event that battery 50 comprises two rechargeable GATES "X" cells, for example, the total voltage across which zener diode ZD is connected is about 4.7 volts DC. Thus, zener diode ZD is preferably a 4.7 volt, 5 watt zener diode.

The placement of the rectifier is such that battery charging current is derived from the main end-to-end beam current of the lamp, i.e. the battery and its voltage limiting shunt zener diode are in series with the lamp beam current, not drawing power from either the preheat or the line directly.

The inverter circuit 52 of FIG. 1 appears in FIG. 2 as including a transistor TR1 which, when energized as by closing of switch 58, oscillates at a frequency determined by the circuit components described below. Inverter circuit 52 also includes bias resistor 74, diodes 76 and 78, and capacitors 80, 82 and 84, all connected as shown in FIG. 2. An oscillation transformer 72 having a collector winding L1, a base winding L2 and an output winding L3 is connected to transistor TR1 so that an oscillatory condition will result when transistor TR1 is energized, owing to a measure of coupling provided between windings L1 and L2 which provides positive feedback to the base of transistor TR1. The frequency of oscillation of inverter circuit 52 will depend, of course, on the inductances of windings L1 and L2, and the values of capacitors 80, 82 and 84 when these components are connected as shown in FIG. 2. Preferably, the aforesaid components are chosen so that the frequency of oscillation of the output voltage induced in winding L3 of the oscillation transformer 72 is about 20 kilohertz. It will also be apparent that the number of turns provided for the winding L3 is such as to provide sufficient operating voltage for lamp 12 when it draws beam current under emergency operating conditions. This is a conventional design within the state of the art.

As shown in FIG. 2, one of the leads from winding L3 on oscillation transformer 72 is connected by conducting lead 85 to one of the lamp pins 20b at 87. This connection 87 can be easily made by a slip on wafer cap, for example, and can be accomplished by the user without the need for an outside electrician to comply with electrical codes in that the connection 87 is made directly to one end of the lamp 12, and not directly to a ballast or other wiring normally disposed within a lamp fixture.

Switch 56, shown in FIG. 2 as the contacts of relay RY1, transfers operating potential and current for the lamp 12 from the ballast 14 (unshown) through the rectifier charger unit 48 when the AC power is on, and provides operating potential and current for the lamp 12 from the inverter circuit 52 when the AC line fails.

Thus, in the position shown in FIG. 2, switch 56 has a common terminal which is connected to one lead of output winding 68 of isolation transformer 54. A normally open contact of switch 56 connects to one input terminal of diode bridge network 70 in charger unit 48, and a normally closed contact of switch 56 connects to the other lead from oscillator transformer output winding L3. The other input terminal of the bridge 70 is connected to one lead of input winding 66 of isolation transformer 54.

Referring again to rectifier charger unit 48, zener diode ZD is connected directly across the output terminals of bridge network 70 and across battery 50, as well, when the battery 50 is inserted in the system 10. Shunt voltage regulation is thereby provided by this particular configuration, although additional components, obvious to a skilled art worker, may be included in rectifier charger unit 48 to prevent damaging of the battery 50 under charging conditions. It is, however, important for proper operation of the system 10 that the normal lamp current be allowed to pass between the input terminals of bridge network 70 as by the connection of a conducting element such as zener diode ZD between the output terminals of the bridge network 70.

Further, it will be apparent that whether or not battery 50 is inserted within the system 10, bridge network 70 and zener diode ZD will allow normally derived operating beam current for the lamp 12 to pass.

Operation of the embodiment of the system 10 shown in FIG. 2 will now be described. It will be assumed that a suitable rechargeable battery 50 is operatively inserted in the system 10 in FIG. 2. During normal, i.e., AC powered operation of the lamp 12, the lamp beam current follows a path leading from the leads 26 from the ballast 14 through the rectifier charger unit 48, switch 56, the lamp terminals 20a, lamp terminals 20b and the ballast leads 28. Isolation transformer 54 provides the required AC filament pre-heat voltage from ballast 14 to lamp terminals 20a, but blocks any flow of lamp beam current directly therethrough.

It will be appreciated that during normal AC powered operation, the operating current for the lamp 12 is caused to flow through the rectifier charger unit 48. This AC lamp current thereby serves, in part, to charge battery 50 to a voltage regulated by zener diode ZD as the current is directed by the bridge network 70 to always flow in a reverse direction through zener diode ZD.

When the AC line to which ballast 14 (FIG. 1) is connected is alive, pre-heat filament voltages appear on the ballast output lead pairs 26, 28, the presence of such voltage indicating that the AC line is alive. During such times it is, of course, necessary to deactivate or "hold off" the operation of inverter circuit 52 as by disconnecting battery 50 therefrom, so as to avoid unnecessary power drain from the battery 50. Such "hold off" is preferably accomplished by having switch 58 keep battery 50 disconnected from inverter circuit 52 as long as relay coil 64 is energized. Although relay RY2 is shown in FIG. 2 as being a DC relay, thereby requiring diode bridge network 61 to provide a DC energizing voltage to its coil 64, it is understood that relay RY2 may be an AC relay or, alternatively, may be substituted by an equivalent solid state device operative to disconnect and connect battery 50 to inverter circuit 52 depending upon the state of the AC line.

Similarly, relay RY1 is responsive to pre-heat AC filament voltage across ballast leads 26 by way of the connection of its coil 62 across the output of bridge network 61.

It will be understood that in the "hold off" or AC "power on" condition, the output winding L3 on oscillation transformer 72 must be disconnected from the lamp 12 when a normal, i.e., 60 hertz operating potential is supplied across the lamp 12 by the ballast 14. Otherwise, winding L3, which has a substantially low impedance at 60 hz., will short circuit lamp 12 and cause damage to ballast 14. This disconnection is effected by opening the circuit between one output lead of winding L3 and the lamp 12 by way of the switch 56. During normal, i.e., 60 hz. AC operation, switch 56 also operates to complete the path of operating current from ballast 14 to lamp 12, as mentioned above. Disconnection may also be accomplished by a capacitor in series with 85 which provides an essentially open circuit at 60 hz. and a direct connection at the typical operating frequency of 52. This is also typical of the current state of the art for systems with no electromechanical components.

When AC power fails and the AC line is no longer alive, the AC pre-heat filament voltage across ballast output lead pair 26 is no longer present, thereby de-energizing the windings of relays RY1, RY2 and causing switches 56 and 58 to assume AC "power off" conditions, as shown by dotted lines in FIG. 2, respectively.

Thus, switch 58 connects battery 50 to inverter circuit 52, and switch 56 connects the output winding L3 from inverter circuit 52 fully across the lamp 12 while preventing, along with isolation transformer 54, the inverter output voltage on winding L3 from being applied to lead pair 26 of the ballast 14.

The emergency lighting system of the present invention will operate not only in combination with lamps requiring a pre-heat filament voltage such as the rapid start (RS) type fluorescent lamps, but will work as well in combination with instant start (IS) lamps having no pre-heat filaments. Moreover, typical lengths for the IS lamps are 4, 6 and 8 feet. Thus, substitution of an IS lamp 2 feet shorter than the original, the substituted lamp to be used in combination with an emergency lighting system according the present invention, will allow correspondingly greater room for the provision of rechargeable batteries. The additional battery energy would permit the substituted lamp to operate at a much higher brightness than would the corresponding lamp 12 in the embodiment of FIGS. 1 and 2, wherein the emergency lighting system 10 is preferably packaged in a cylindrical housing of about one foot in length.

Figure 3:
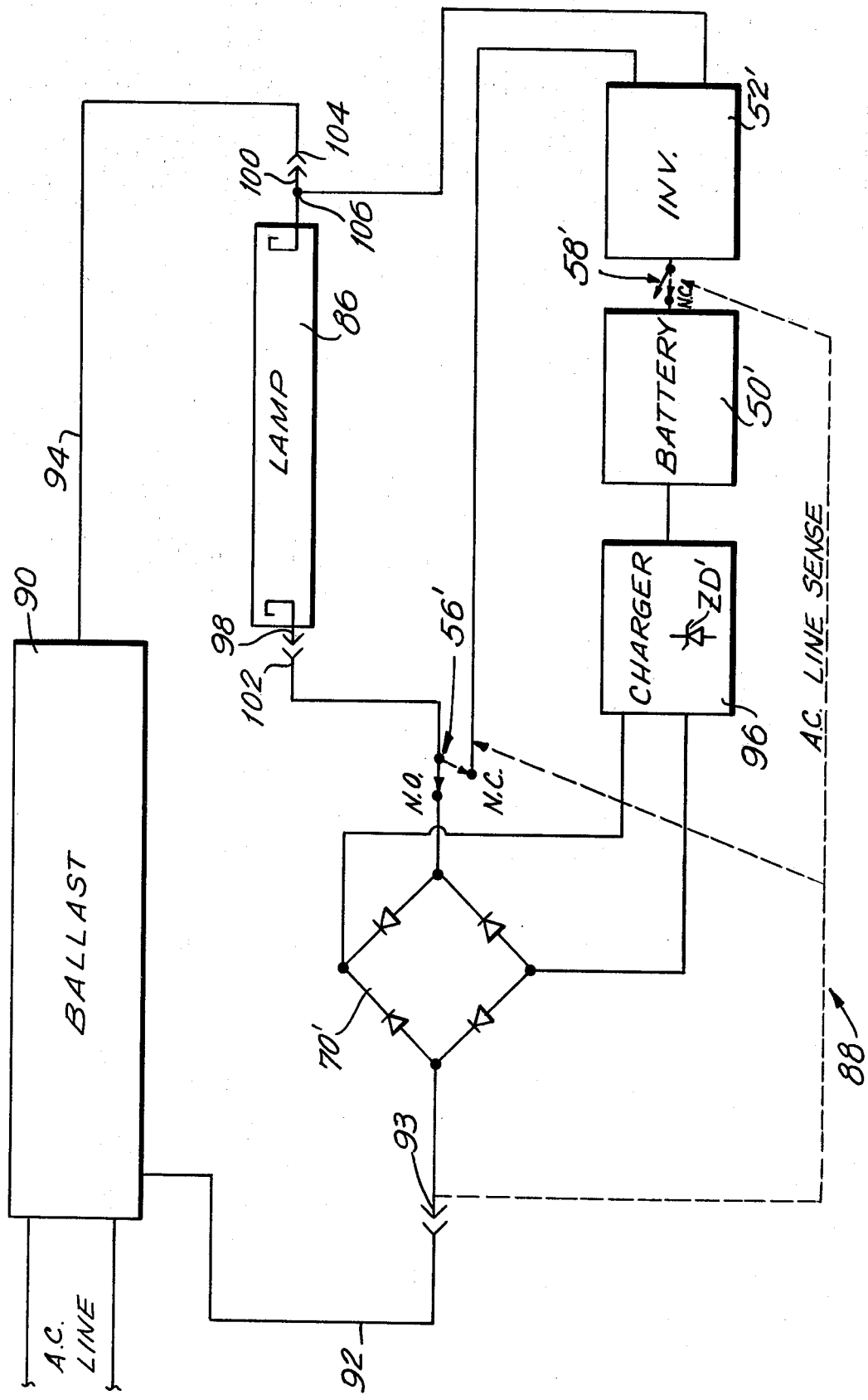
FIG. 3 is a block diagram of another embodiment of the emergency lighting system according to the present invention, for lamps without pre-heat.

Modification of the present system 10, shown in FIGS. 1 and 2 to provide for emergency operation of IS type lamps is now described with regard to FIG. 3.

An instant start lamp 86 is connected within an emergency lighting system 88, in accordance with the present invention, the system 88 basically being arranged similarly to the system 10 of FIGS. 1 and 2. The major differences in the system 88 as compared to the system 10 are (1) the lack of a filament isolation transformer, and (2) "hold off" means which senses the presence of normally developed lamp operating voltage instead of a filament pre-heat voltage.

The emergency lighting system 88 of FIG. 3 otherwise includes components similar to those of the system 10 of FIGS. 1 and 2, such similar components being correspondingly numbered. Further, lamp ballast 90 shown in FIG. 3 need have only single output leads rather than pairs of such leads for connecting to ends of the lamps used in combination therewith.

A cylindrical housing for the system 88, similar to the housing described below in regard to FIGS. 5 and 5A, is also preferred so that the lamp 86 and system 88 can be operatively joined to one another within the housing and easily mounted as a single unit in a conventional lamp fixture.

One of the leads 92 from the ballast 90 is connectable to an input pin terminal 93 on diode bridge network 70', the pin terminal 93 extending out from one end of the preferred system housing. The output terminals of diode network 70' are connected to a battery charger unit 96 which may simply comprise a zener diode ZD' arranged to be connected across a rechargeable battery 50' as in the system 10 of FIGS. 1 and 2. Charger unit 96 operates to charge battery 50' which, in turn, powers inverter circuit 52' when the AC power line fails. Battery 50' is then connected to energize inverter circuit 52' by switch 58' which may be constructed and operate similarly to relay RY2 in FIG. 2. Switch 56' is interposed to selectively connect lamp terminal 98 to an input terminal of diode network 70' or to inverter 52', depending on whether power is on or off, respectively. Switch 56' may be constructed and may operate similarly to relay RY1 in FIG. 2.

Switches 56' and 58' are preferably actuated in response to the presence of full lamp operating potential on one or both of the AC ballast outpt leads 92, 94, to thereby maintain the system 88 in a "hold off" or AC "power on" operating mode. Such switch actuation can be effected, for example, by the use of sensitive relays similar to the relays RY1 and RY2 in the system 10, as noted above, these relays (unshown in FIG. 3) having moving contact members thereon correponding, respectively to switches 56' and 58' in FIG. 3. Coils associated with each of these relays would then each be energized in response to the aforesaid normally developed lamp operating potential on ballast leads 92, 94, as by way of suitable conventional coupling circuits. Alternatively, solid state devices such as optoisolators, for example, may be used to accomplish the circuit functions of the switches 56', 58', or other equivalent circuit elements may be employed as would be apparent to one skilled in the art.

Also, one of the output leads of inverter circuit 52' is connected at 106 to lamp pin 100 as by a slip on wafer contact or other secure electrical connection. This connection 106 is similar in effect and arrangement to the connection 87 appearing in FIG. 2 to one of the pins 20b on lamp 12, therein.

The preferred cylindrical package for the emergency lighting system 88, including lamp 86, would therefore have pin connectors 93, 100 at each of its ends, respectively, for mounting of the system 88 and lamp 86 to a fixture containing the ballast 90. The system and lamp would then be electrically connected to the ballast 90 as required for normal AC operation of the lamp 86.

Operation of the emergency lighting system 88 is similar to that of the system 10 of FIGS. 1 and 2. During normal operation, i.e., when the AC main line is operative, a lamp operating potential appears on output leads 92, 94 of the ballast 90. This output potential is applied to connecting pins 93, 100 of the system 88 and lamp 86, respectively, and is detected by conventional means (not shown) such as, for example, the relay coils or opto-isolators, above mentioned, which in turn act to maintain switches 56', 58' in their normal "hold off" positions as shown in FIG. 3.

With switches 56', 58' in their normal states, lamp operating current passes in series from the ballast 90 through the lamp 86, switch 56', charger unit 96 and back to the ballast 90. Inverter circuit 52' is inactive owing to switch 58' whick keeps battery 50' disconnected therefrom during the "hold off" or AC "power on" operating mode of the system 88.

The output of the inverter circuit 52' is also de-coupled from the lamp 86, in the "hold off" mode, by way of switch 56' which operates to disconnect one of the inverter circuit output leads from lamp 86, as shown in FIG. 3.

In practice, more complex circuitry than that illustrated thus far in the drawings may be used, although the basic operating components of the emergency lighting system of the present invention have already been disclosed. For example, load shedding, i.e., low battery voltage cutoff, can be added to protect the rechargeable battery 50 or 50' from deep discharge damage. Also, a more sophisticated charging circuit than the shunt zener diode ZD or ZD' shown herein would reduce heat output at full charge. Further, a "core switched" design for the inverter circuits herein disclosed would reduce transistor base drive losses, such losses being significant at low voltages.

In the event emergency operation is to be held off depending upon the state of an AC line which differs from the line which powers the lighting fixture, a separate input to the present system can be provided, by way of an opto-isolator or transformer, for example, to maintain the present system in the "hold off" mode of operation. Such an input could be introduced to the present system through a molded plug in the shell of the preferred system package, for example, and would require only minimal external wiring to bring an input control line from the separate controlling AC line to the package. A preferred arrangement for this separate input is disclosed below.

Figures 4, 4A:
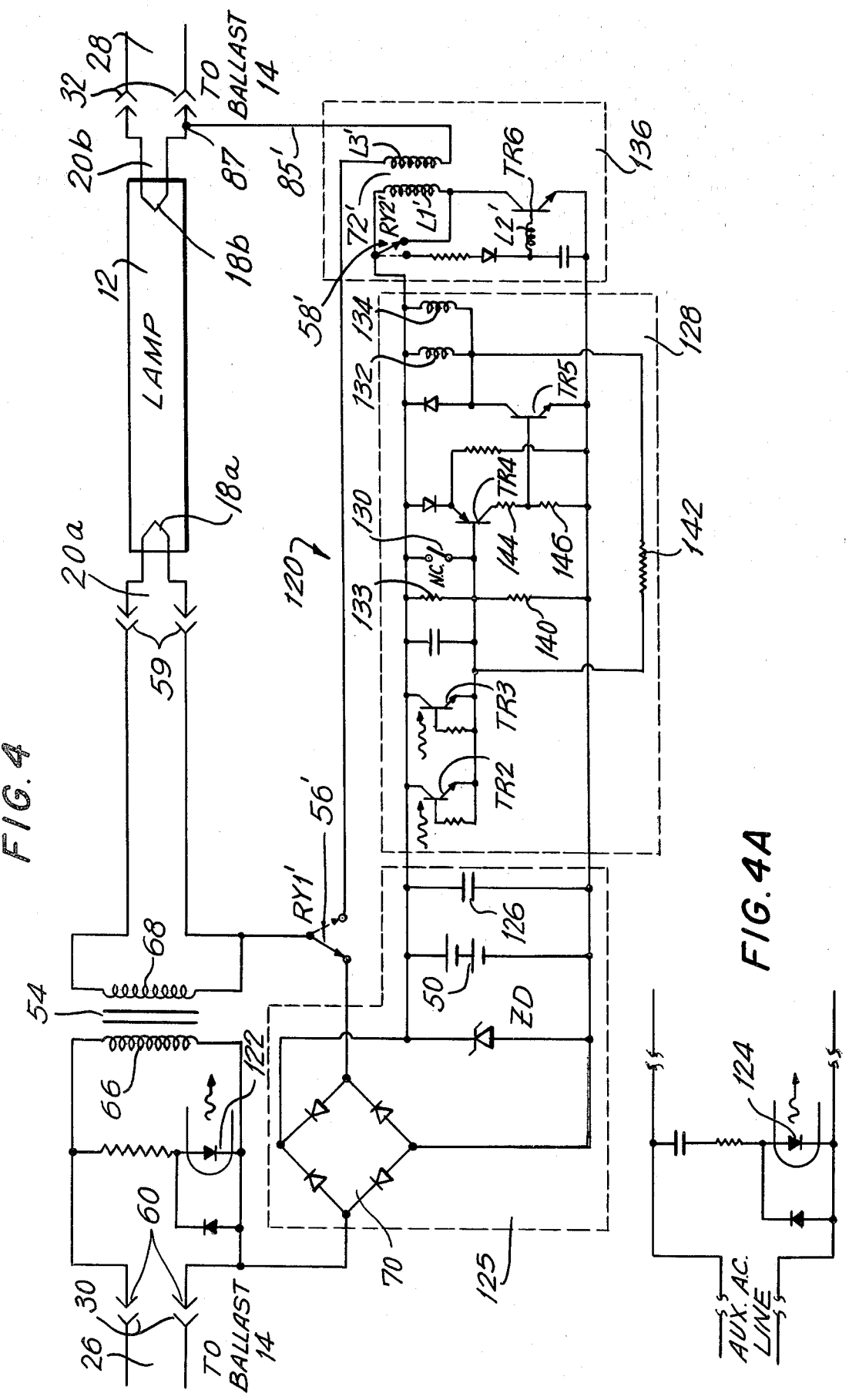
FIGS. 4 and 4A are schematic diagrams of another preferred embodiment of the emergency lighting system of FIG. 1.

A further embodiment of the emergency lighting system of the present invention, in which operation of the system is held off provided the AC line powering the lighting fixture in which the system is incorporated, or another AC line termed an "auxillary AC line", is alive is shown schematically in FIGS. 4 and 4A.

For purposes of illustration, emergency lighting system 120 in FIGS. 4 and 4A is used in combination with the rapid start lamp 12 which normally operates off of a ballast such as the ballast 14 in FIGS. 1 and 2.

Ballast output lead pairs 26 and 28 terminate in conventional pin connectors 30,32 arranged in the lamp fixture as indicated in FIG. 4. It is to be understood, however, that the emergency lighting system 120 of FIGS. 4 and 4A can be arranged to operate in combination with the instant start lamp 86 which normally operates off of a ballast such as 90 in FIG. 3, in which case isolation transformer 54 would not be required, and other obvious circuit modifications would be made such as would be apparent to one skilled in the art. In the system 120, those components corresponding to similar components in the embodiment of FIGS. 1 and 2 are correspondingly numbered.

Basically, the embodiment of FIGS. 4 and 4A differs from that of FIGS. 1 and 2 in that opto-isolators 122, 124 are used to sense the presence of AC filament preheat voltage from the ballast 14 on output lead pair 26 (FIG. 4) and AC line voltage on the auxiliary AC line (FIG. 4A), respectively. Thus, AC on the main or auxillary lines will be detected by either of opto-isolators 122, 124 which contain light emitting diodes (LED's) which emit light in response to the sensed AC voltage and photosensitive transistors TR2, TR3 which detect the light emitted by the LED'S in the opto-isolators 122 and 124 embodied within the system 120, these transistors being later described. While the LED'S and phototransistors of opto-isolators are shown remote from each other in the circuit diagram of FIG. 4, they clearly must be physically close in order for the light from the LED'S to be detected by the phototransistors and, in fact, as preferred they are in a unitary package as is well known in the art.

The system 120 basically includes the isolation transformer 54 which operates to couple pre-heat filament voltage from the ballast output leads 26 to one of the pre-heat filaments 18a of lamp 12 by way of lamp pins 20a. Isolation transformer 54 also operates, when both the AC main and auxillary line fail, to isolate inverter circuit 136 provided within the system 120 from the AC ballast 14 within the lamp fixture.

The system 120 also includes a rectifier charger circuit 125 comprising diode bridge network 70 and zener diode ZD as in the embodiment of FIGS. 1 and 2. An electrolytic capacitor 126 is also provided and is connected across zener diode ZD and separately supplied rechargeable batteries 50.

Further, system 120 features a switching circuit 128 which includes the photosensitive transistors TR2, TR3 of opto-isolators 122, 124 which respond to the LED's of opto-isolators 122, 124, respectively. The switching circuit 128 operates to disable the emergency lighting system 120 from energency operation as long as either of the AC main or auxillary lines is alive. Switching circuit 128 also includes a mechanically actuable switch 130 which disables the system 120 from operation when it is not inserted in the lamp fixture in combination with the lamp 12, i.e., when the system 120 is being shipped or stored. This disabling feature will be discussed further below.

Continuing with the description of the system 120, switching circuit 128 also includes transistors TR4, TR5, transistor TR5 operating to energize coils 132, 134 of electromagnetic relays RY1', RY2', respectively, as long as transistor TR5 is maintained in an ON state by conduction of transistor TR4.

An inverter oscillator circuit 136 in the system 120 includes transistor TR6 and an oscillation transformer 72' having windings L1', L2', and L3'. Emergency operating potential for the lamp 12 is produced in output winding L3' when both the main and auxiliary AC lines fail.

Operation of the emergency lighting system 120 of FIGS. 4 and 4A will now be described with regard to its normal or "hold off" mode of operation. After the system 120 is inserted into the lamp fixture, in combination with the lamp 12, switch 130 is brought to an open state, as shown in FIG. 4, thereby allowing the base potential on transistor TR4 of the switching circuit 128 to be controlled or clamped only by conduction of the photosensitive transistors TR2, TR3. The physical placement of switch 130 on the preferred housing for the system 120 is shown and described later in connection with FIGS. 5 and 5A.

As long as either of the AC main or auxillary lines operates, a corresponding one of the LED's opto-isolators 122, 124 emits light which is directed onto the phototransistors TR2, TR3, respectively, thereby biasing transistor TR4 in an OFF state.

Assuming that both of the main and auxillary AC lines are active, both the phototransistors TR2, TR3 are brought to a conductive or ON state owing to the emission of light from both LED's opto-isolators 122, 124 directed towards transistors TR2, TR3, respectively. The base of switching transistor TR4 is thereby clamped to battery potential and the transistor TR4 is held in a non-conductive or OFF state. Thus, no current flows through the collector circuit of transistor TR4 and no significant voltage is produced across voltage divider resistors 144, 146 or at the base of transistor TR5.

Transistor TR5 is maintained in an OFF state due to the lack of sufficient base potential thereon and, as a result, no collector current is caused to flow through and energize relay coils 132, 134 in the collector circuit of transistor TR5. Switches 56', 58', which are actuated by the relays RY1', RY2', respectively, are maintained in the states shown in FIG. 4 so long as the coils 132, 134 on the relays RY1' and RY2' are not energized.

With the switches 56', 58' in their respective "hold off" states, as shown, normal operation of the system 120 closely corresponds to that of the system 10 in FIGS. 1 and 2. A filament pre-heat voltage is brought from ballast 14 to lamp filament 18a by way of isolation transformer 54 which has its windings connected to pin pair 60 and connector pair 59, respectively. Pre-heat voltage for lamp filament 18b is obtained directly from lead pair 28 coming from the ballast 14.

Normal operating current for lamp 12 is derived from the ballast 14 and passes through the rectifier charger circuit 125, switch 56' and the lamp 12, all of which are effectively series connected with one another. Also, similarly to the arrangement in the system 10 of FIGS. 1 and 2, the output winding L3' of oscillation transformer 72' is unconnected from lamp 12 by way of switch 56' during normal AC operation thereof, so as to prevent shorting out of the lamp 12.

It will be apparent that, when using the system 120 of FIGS. 4 and 4A in combination with the lamp 12 in a conventional lamp fixture, it is possible to turn off the lamp 12 in the conventional manner as by switching off the AC main line connection to the ballast 14 in the fixture. This is so because the presence of AC on the auxillary AC line (FIG. 4A) is still detected and the LED of opto-isolator 124 emits light onto phototransistor TR3, thereby clamping switching transistor TR4 in an OFF state to disable the inverter oscillator circuit 136. Of course, if the auxillary AC line fails or is otherwise turned off, the system 120 will be placed in an emergency or AC "power off" mode and the inverter oscillator circuit 136 will be energized to illuminate lamp 12, as explained below.

When both of the aforesaid AC lines fail to operate, transistors TR2 and TR3 are placed in an OFF state due to loss of light normally produced by the opto-isolators 122, 124. The base potential of transistor TR4 is then determined by bias resistors 138, 140 and 142 which then operate to bring transistor TR4 into a conductive state. Voltage dividing resistors 144, 146 in the collector circuit of transistor TR4 then produce an output voltage which is applied to the base of transistor TR5 to bring the transistor TR5 into a conductive or ON state. Relay coils 132, 134, being connected in series with the collector of transistor TR5, are thereby energized to actuate relays RY1', RY2' which, in turn, bring switches 56', 58' to their respective "power off" operating positions as shown in dotted lines in FIG. 4.

With relays RY1', RY2' actuated, the inverter circuit 136 is energized by way of switch 58' which connects the battery 50 thereto. One of the leads from output winding L3' in inverter circuit 136 is connected by switch 56' to one of the lamp pins 20a at one end of the lamp 12. The remaining output winding lead from inverter circuit 136 is connected to one of the lamp pins 20b at the other end of the lamp 12 by way of conducting lead 85' which is connected by a slip on wafer contact or other secure means to the lamp pin at 87'. Thus, the lamp 12 is energized by way of the output potential developed by inverter circuit 136, the inverter circuit output being isolated from the ballast 14 within the lamp fixture by way of the isolation transformer 54 and the switch 56'.

A preferred housing for the emergency lighting system of the present invention, and its relation to a particular lamp and a conventional lamp fixture, are illustrated in FIGS. 5 and 5A. In the following discussion thereof, it will be assumed that housing 150 contains the emergency lighting system 120 of FIGS. 4 and 4A, although it is to be understood that a housing such as 150 is also preferred for all other systems according to the present invention as disclosed herein.

Housing 150 preferably comprises an elongated tube 152 having a circular cross section, the tube 152 being preferably made of a sturdy clear plastic material. Tube 152 may also be made of glass, although plastic is preferred for its lower cost and weight, as well as for its ability to withstand sudden strain and other mechanical shocks as would likely be encountered during shipping and installation of the housing 150 and the components mounted therein.

The housing 150 preferably contains emergency lighting system 120 at one end as shown in FIG. 5, the system 120 extending, for example, about one foot (30.5 cm.) into tube 152 from its right end. The remainder of the interior of tube 152 is occupied by the lamp 12 which is operatively connected at its right end to the system 120 by way of lamp pins 20a, as shown in FIG. 5A. It is also preferred that the portion of tube 152 within which the system 120 is contained be painted or otherwise opaquely coated on either its inside or outside surfaces, or both, although such coating is not essential for proper operation of the installed system. For improved weight distribution and optical centering, the system could be divided and placed at both ends.

Further details of the present system are shown in FIG. 5A. In particular, the lamp 12 is secured at the left end of the housing 150 by way of an end cap 154 which is preferably made of the same material as tube 152. End cap 154 is seated within the left end opening of tube 152 by way of an integrally formed circular flange 156, for example, or other equivalent means whereby end cap 154 is securely held in position at the end of tube 152.

End cap 154 has a circular opening therethrough of a diameter just sufficient to allow lamp cap 158 on the end of the lamp 12 to clearly pass therethrough. Thus, when lamp 12 is operatively inserted within housing 150, and the end cap 154 is placed over cap 158 on the lamp 12 and seated within the end of tube 152, end cap 154 operatively bears against the end portion of lamp 12 as shown in FIG. 5A and securely holds lamp 12 within housing 150. The opposite end of lamp 12 is held in place by way of its end pins 20a which engage the pin connectors 59 (unshown) in the system 120, and is supported by end cap 154.

It will be recalled that an electrical connection must be effected between system 120 and one of the lamp pins 20b at the end of lamp 12 which extends through end cap 154. Thus, as shown in FIG. 5A, the insulated conducting lead 85' extends from the system 120 at one end of housing 150 towards the opposite end of the housing between the outside surface of lamp 12 and the inside surface of tube 152, and out through a small opening 160 provided through end cap 154. Lead 86' connects at 87' to one of the lamp pins 20b by a slip on wafer contact, for example, as noted above.

It will further be recalled that in the system 120 as shown in FIG. 4, provision is made for the sensing of AC power on an auxillary AC line by way of phototransistor TR3 which responds to light emitted from the LED of opto-isolator 124. An opto-isolator is a single small component and an Underwriters Laboratories recognized recessed male plug 162 molded into the housing would be a satisfactory way of introducing the auxillary A.C. signal.

Moreover, the disabling switch 130 which, in the system 120 of FIG. 4, acts to disable the inverter oscillator circuit 136 of system 120 when the system is not installed in a fixture, is shown in FIGS. 5 and 5A as having a moveable deactuating button which extends out from the system end of the housing 150 between connecting pins 60 of the system 120. It will be apparent, therefore, that when the housing 150 containing the present system 120 and the lamp 12 is inserted between a pair of oppositely facing lamp pin sockets 164a and 164b on a lamp fixture 166 as shown in FIG. 5, the switch 130 is deactuated in that the button thereof is depressed by the body of socket 164b so as to allow the system 120 to enter into an emergency operating mode when power on the main and auxillary AC lines is no longer present. Switch 130 also acts as a manual test switch when the unit is not installed in a fixture. In FIG. 5, voltage is brought from the auxillary AC line by way of lead pair 168 and plug 162 which energizes opto-isolator 124. Also, AC for powering the fixture 166 is brought by way of the lead pair 16 to the ballast 14 within the fixture 166.

In the event it is desired to use the system 120 of FIGS. 4 and 4A in combination with a conventional lamp fixture which may be switched on and off as desired, and emergency operation is desired only when the AC line which powers the fixture fails, then the lead pair 168 should be ignored and no installation wiring is required.

It is believed that the emergency lighting system of the present invention will provide a valuable and superior alternative to conventional emergency lighting systems. The present system provides easy and inexpensive installation procedures.

Additional variations and modifications of the emergency lighting system of the present invention will be apparent to those skilled in the art. As stated, solid state switching may be substituted for the electromechanical relays disclosed herein, and other refinements tending to lessen battery power consumption can also be provided. It is therefore intended that all such variations and modifications including those expressly stated herein, and all others, be included within the spirit and scope of the present invention as defined in the appended claims.

What is claimed as new and desired to be secured by Letters Patent is:

1. A fixture mountable system for energizing an internally ballasted lamp of the type designed to operate when said fixture is connected to an AC line, said lamp illuminating when an operating potential is applied to first and second terminals on said lamp by corresponding first and second terminals on said fixture to produce an operating current through said lamp, said system including battery terminal means for connection to a rechargeable battery for providing emergency illumination power to said system when said AC line is deenergized, said system comprising:

battery charge means having a pair of input terminals and a pair of output terminals, one of said input terminals of said charge means being operatively connected to said first fixture terminal, and the other one of said input terminals of said charge means being operatively connected to said first lamp terminal when said AC line is energized, said pair of charge means output terminals being operatively connected to respective terminals on said battery, said battery charge means including a rectifier circuit arranged to pass said lamp operating current between said charge means input terminals and to develop a DC charge voltage for charging said battery by rectifying said lamp operating current;

inverter circuit means having an input terminal operatively connected to said battery when said AC line is deenergized, a first output terminal operatively connected to said first lamp terminal when said AC line is deenergized, and a second output terminal operatively connected to said second lamp terminal, said inverter circuit means developing an AC output potential corresponding to said lamp operating potential for illuminating said lamp when said AC line is deenergized;

first switch means for operatively connecting said first lamp terminal to either of said other input terminal of said charge means when said AC line is energized and said first output terminal of said inverter circuit means when said AC line is deenergized;

second switch means for operatively connecting said input terminal of said inverter circuit means to said battery when said AC line is deenergized; and means for mounting said system in combination with said lamp and said battery in said fixture, said mounting means including a housing for containing said system and said lamp and said battery when operatively connected to one another, said housing having connector means extending therefrom for operatively connecting said system to said fixture terminals when said housing is mounted in said fixture;

whereby said battery charge means is coupled in series with said lamp operating current developed when said AC line is energized and said battery is thereby charged, and said inverter circuit means is coupled to said lamp to illuminate said lamp by power developed from said battery when said AC line is deenergized.

2. A fixture mountable system for energizing a lamp of the type designed to operate in combination with a ballast within said fixture and connected to an AC line, said lamp illuminating when an operating potential is applied to first and second terminals on said lamp by corresponding first and second terminals on said ballast to produce an operating beam current through said lamp, said system including battery terminal means for connection to a rechargeable battery for providing emergency illumination power to said system when said AC line is deenergized, said system comprising:

battery charge means having a pair of input terminals and a pair of output terminals, one of said input terminals of said charge means being operatively connected to said first ballast terminal, and the other one of said input terminals of said charge means being operatively connected to said first lamp terminal when said AC line is energized, said pair of charge means output terminals being operatively connected to respective terminals on said battery, said battery charge means including a rectifier circuit arranged to pass said lamp beam current between said charge means input terminals and to develop a DC charge voltage for charging said battery by rectifying said beam current;

inverter circuit means having an input terminal operatively connected to said battery when said AC line is deenergized, a first output terminal operatively connected to said first lamp terminal when said AC line is deenergized, and a second output terminal operatively connected to said second lamp terminal, said inverter circuit means developing an AC output potential corresponding to said lamp operating potential for illuminating said lamp when said AC line is deenergized;

first switch means for operatively connecting said first lamp terminal to either of said other input terminal of said charge means when said AC line is energized and said first output terminal of said inverter circuit means when said AC line is deenergized;

second switch means for operatively connecting said input terminal of said inverter circuit means to said battery when said AC line is deenergized; and means for mounting said system in combination with said lamp and said battery in said fixture, said mounting means including a housing for containing said system and said lamp and said battery when operatively connected to one another, said housing having connector means extending therefrom for operatively connecting said system to said ballast when said housing is mounted in said fixture;

whereby said battery charge means is coupled in series with said operating beam current developed by said ballast when said AC line is energized and said battery is thereby charged, and said inverter circuit means is coupled to said lamp to illuminate said lamp by power developed from said battery when said AC line is deenergized, the AC output potential developed by said inverter circuit means being isolated from said ballast.

3. A system according to claim 2, wherein said rectifier circuit comprises a diode bridge and said battery charge means further includes a zener diode connected across said pair of battery charge means output terminals.

4. A system according to claim 2, wherein said lamp further includes additional first and second terminals thereby defining first and second pairs of lamp terminals, each of said lamp terminal pairs being connected to a respective filament within said lamp for pre-heating said lamp, and said ballast further includes additional first and second terminals thereby defining corresponding first and second pairs of ballast terminals for applying a pre-heat filament voltage to each of said first and second pairs of terminals, and said system further comprises an isolation transformer having windings operatively connected to said first pair of ballast terminals and said first pair of lamp terminals, respectively, said isolation transformer operating to substantially isolate said AC output potential developed by said inverter circuit means from said ballast and to cause said operating beam current developed by said ballast to pass between said battery charge means input terminals.

5. A system according to claim 4, wherein said first and second switch means comprise relays, each of said relays having an actuating coil which is energized in response to detection of said filament pre-heat voltage on said first pair of ballast terminals.

6. A system according to claim 2, further comprising first disable means operatively connected to said AC line and said inverter circuit means for disabling said inverter circuit means when said AC line is energized.

7. A system according to claim 6, wherein said first disable means comprises an opto-isolator.

8. A system according to claim 6, further comprising second disable means operatively connected to said inverter circuit means for disabling said inverter circuit means when said housing is withdrawn from said fixture.

9. A system according to claim 8, wherein said second disable means comprises a disable switch connected across nodes in said inverter circuit means and actuable to disable said inverter circuit means when said housing is not mounted in said fixture, said disable switch having a moveable deactuating element extending out from said housing through an opening therein, and said fixture further includes means thereon for engaging said moveable element of said disable switch to deactuate said switch when said housing is mounted in said fixture.

10. A system according to claim 8, further comprising third disable means operatively connected to another AC line and to said inverter circuit means for disabling said inverter circuit means when said other AC line is energized.

11. A system according to claim 10 wherein said first and third disable means comprise opto-isolators, respectively.

* * * * *